United States Patent Office.

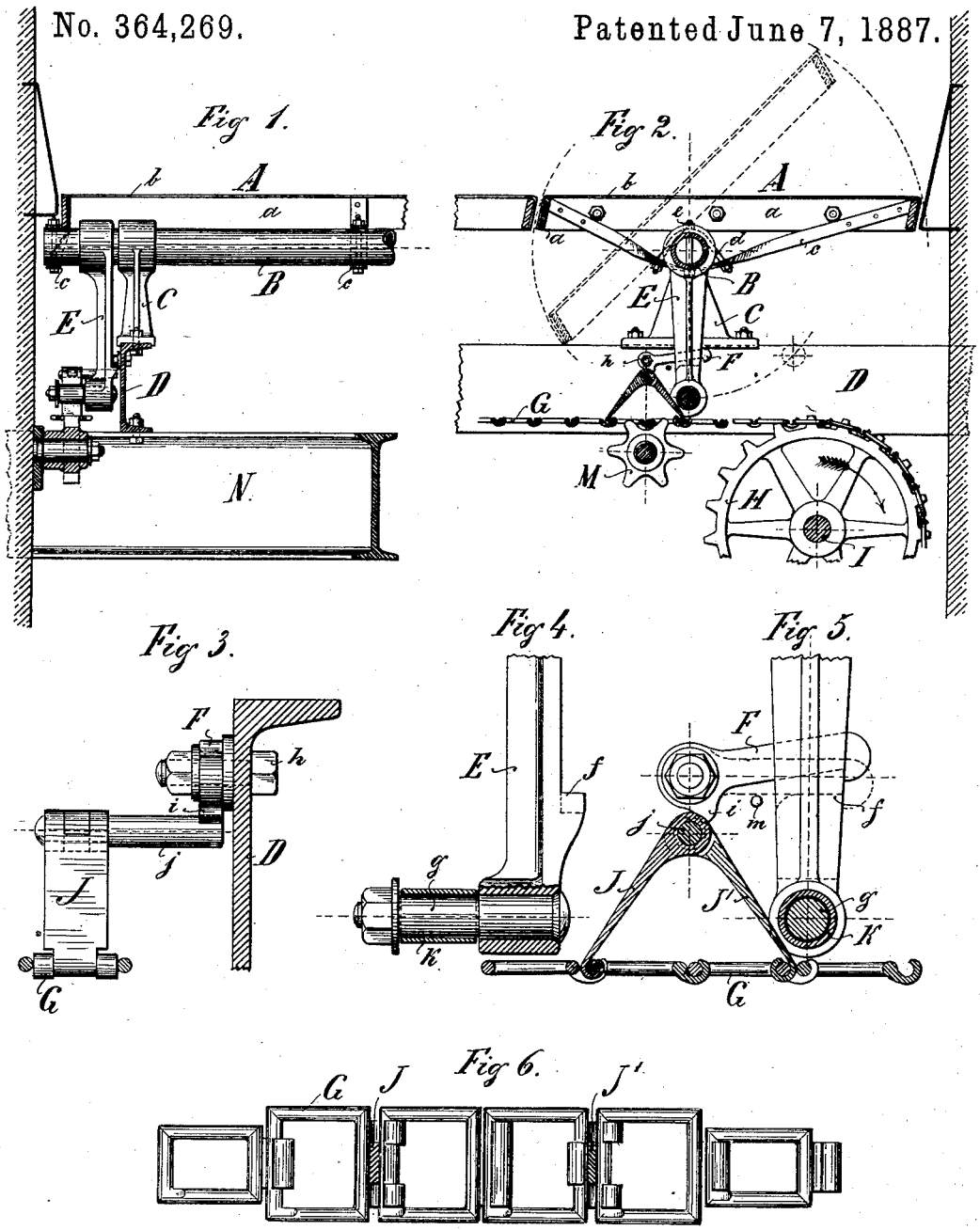
T. LEWANDOWSKI.
MALT KILN FLOOR.
No. 364,269. Patented June 7, 1887.

THEODORE LEWANDOWSKI, OF CHICAGO, ILLINOIS.

MALT-KILN FLOOR.

SPECIFICATION forming part of Letters Patent No. 364,269, dated June 7, 1887.

Application filed February 3, 1887. Serial No. 226,339. (No model.)

*To all whom it may concern:*

Be it known that I, THEODORE LEWANDOWSKI, a citizen of the United States of America, residing at Chicago, in the county of Cook and State of Illinois, have invented certain new and useful Improvements in Malt-Kiln Floors, of which the following is a specification, reference being had therein to the accompanying drawings.

This invention relates to the class of malt-kilns or grain-driers in which several floors are arranged one above the other, each floor being composed of a series of oblong sections pivotally supported in a manner to be tilted for unloading a floor by precipitating the malt or grain spread thereon into the next floor below, whereby such malt or grain is turned, and hand shoveling is rendered unnecessary.

Prior to my invention the cranks or arms of the several tilting trays of a sectional malt-kiln floor were connected by a rod or bar to be tilted simultaneously by a single lever, which requires considerable power, however, and, because all the malt or grain on a floor was thereby precipitated simultaneously, the malt or grain was not turned so completely by the operation as would be desirable; and it has been my object to provide a device by which each tray is tilted independent of the other trays, one by one in successive order, whereby the operation of tilting is made more easy, and whereby the turning of the malt or grain is made more perfect.

My invention therefore consists of the novel devices and combinations of devices hereinafter described and specifically claimed.

In the accompanying drawings, Figure 1 represents a sectional elevation, and Fig. 2 a vertical cross-section, of part of a malt-kiln floor embodying my improvements; and Figs. 3, 4, 5, and 6, detail views of parts of the device, on an enlarged scale.

Corresponding letters in the several figures of the drawings designate like parts.

A denotes one of a series of trays forming a malt-kiln floor, each composed of an iron frame, $a$, the longitudinal side bars of which are formed to be on angular positions so that when tilting, one tray will clear the other, and of perforated sheet metal, $b$, stretched over such frame and secured thereon by bolting or riveting in any usual manner. Each such tray is secured upon a hollow shaft, B, made of gas-pipe, and secured under the end bars of the frame and at intermediate points by brace-bars $c$, passed under shafts B by U-bolts $d$, placed over the shafts with their screw-threaded ends projected through holes in brace-bars $c$, and clamped thereon by nuts and by screw-bolts $e$, passed through holes in shaft B, brace-bar $c$, and U-bolt $d$. A shaft, B, is thus secured longitudinally under each tray, to one side of the center line of the same, in a manner that by its own gravity each tray will seek a horizontal position again after each tilting operation; and each such shaft B is pivotally supported in a series of standard-bearings, C, secured upon laterally-placed channel-beams D, which again are secured upon longitudinal I-beams N.

On each shaft B is mounted a pendent crank-arm, E, provided with a shoulder, $f$, and having secured in its lower eye a crank-pin, $g$, with a thimble, $k$, sleeved thereon and held laterally in position by a nut and washer.

A latch, F, one for each arm E, is pivoted against beam D upon a bolt, $h$, and has a notched end, which by gravity engages shoulder $f$ of crank-arm E for locking each tray on its horizontal position, to hold the same from tilting while the men are walking upon it. Each latch also has a cam, $i$, to its hub for automatically lifting the same, as will be hereinafter described.

An endless chain, G, is stretched over sprocket-wheels H, mounted upon shafts I, that are journaled in suitable bearings near each end wall. This chain has attached two arms, J J', hinged together by a bolt or stud, $j$, so as to form an inverted-V-shaped cam that, while the chain is in motion, will engage the crank-pins $g$ of crank-arms E, one after the other in succession, to tilt each tray for dumping the malt thereon, while the stud $j$ of each cam J J' will lift the latch F by striking cam $i$ of each latch to release arm E a little in advance of cam J J', meeting crank-pin $g$. After the cam J J' has passed from under arm E, the tray will resume its horizontal position again by its own gravity, and the latch F, in the meantime having rested upon a rigid stud, $m$, will slide and drop over shoulder $f$ again for locking such arm.

Under each arm E, I pivot, either against the wall or under beams D, a small sprocket-wheel, M, supporting the upper string of the endless chain G, which chain, as in Fig. 6, may be made with wider links where the cam J J' is attached than at other parts.

The wheels H will always be turned in the same direction, and will be set in motion only at intervals, or when the malt is to be dumped from one floor to another, and for that purpose I apply two cams, J J', placed on opposite positions upon the chain, one of which cams J J' only at the time will come into action, that as the chain moves along will tilt and release again one tray after the other in successive order, and as soon as the last tray has been tilted the motion of the chain will be stopped, when the opposite cam will be in position for the next tilting operation of the trays in the same manner.

For short trays one arm, E, for each and one operating chain will be sufficient, which may be either at one end of the trays or in the middle thereof, while for long trays I can apply an arm to each end, and, if desirable, also one in the middle of each tray, in connection with one chain, G, for each row of arms E, in which case the sprocket-wheels H, for driving such chains, will all be mounted upon a single shaft for affording a simultaneous movement, and the power applied to such shaft may be manual by means of a crank, or may be transmitted from a motor by means of a belt or other contrivance.

What I claim is—

1. In a malt-kiln floor, the combination of a series of tilting sections, each provided with a pendent arm, and means, substantially as set forth, for tilting automatically each section independent of the other sections in successive order.

2. A malt-kiln floor having a series of tilting sections, each provided with a pendent arm, in combination with an endless chain carrying a cam to engage with the pendent arms of the tilting sections independent of each other in successive order, substantially as and for the purpose set forth.

3. A malt-kiln floor composed of a series of tilting sections, each provided with a pendent arm and with a latch engaging such arm for locking such section in its horizontal position, in combination with an endless chain carrying a cam adapted to disengage the latch and to engage the pendent arm of each section, one after the other, for tilting the several sections independent of each other in successive order, substantially as and for the purpose set forth.

In testimony whereof I affix my signature in presence of two witnesses.

THEODORE LEWANDOWSKI.

Witnesses:
WILLIAM H. LOTZ,
OTTO LUBKERT.